United States Patent Office 3,211,314
Patented Oct. 12, 1965

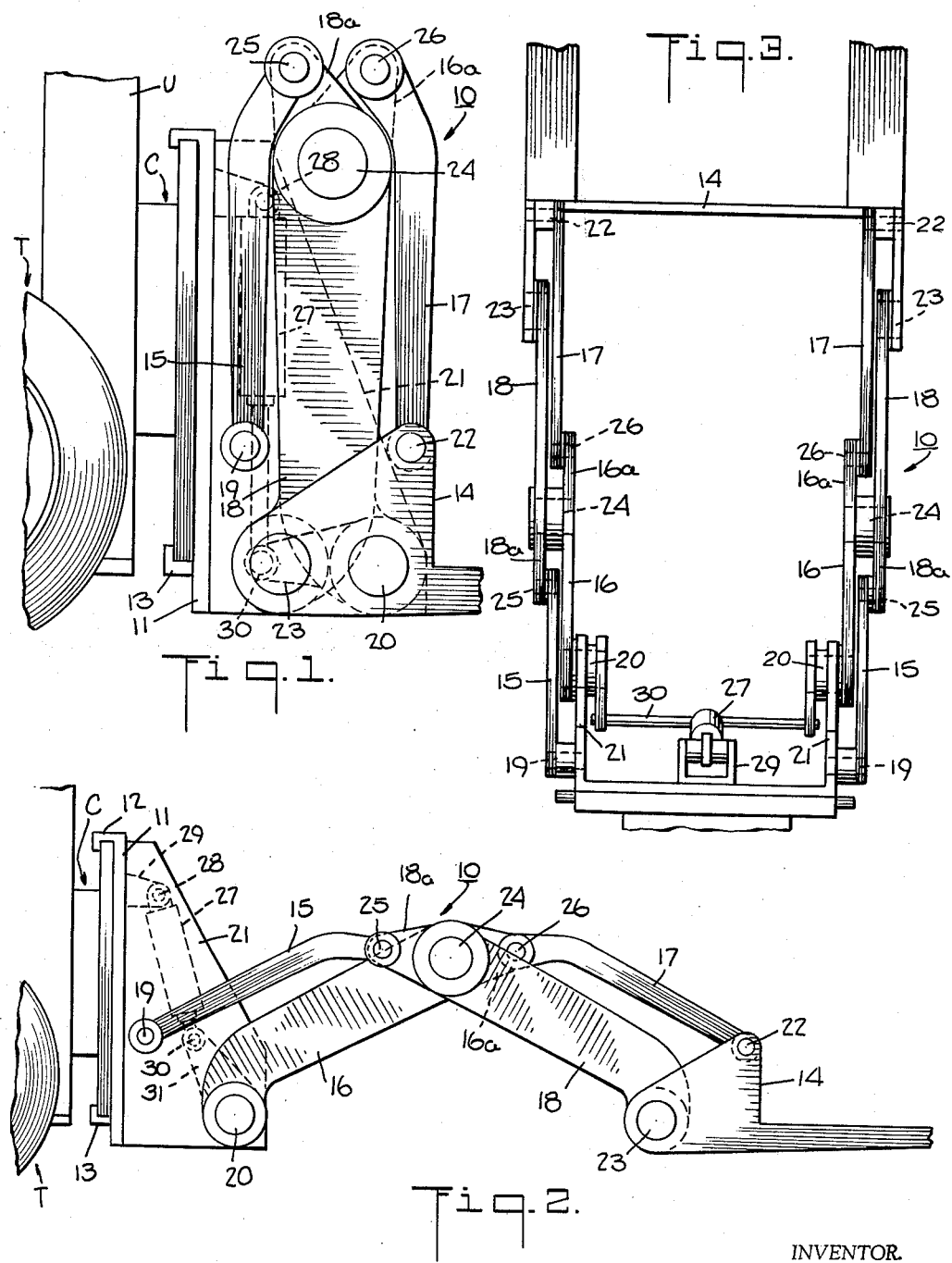

3,211,314
PROJECTING AND RETRACTING LEVER MECHANISM FOR A LOAD SUPPORTING MEMBER ON AN INDUSTRIAL TRUCK
Bronislaus I. Ulinski, Flossmoor, Ill., assignor, by mesne assignments, to Yale & Towne, Inc., New York, N.Y., a company of Ohio
Filed May 24, 1963, Ser. No. 283,104
6 Claims. (Cl. 214—730)

This invention relates to an industrial truck and more particularly to a linkage for projecting and retracting load forks or a load platform relatively to a vertically moving carriage.

Mechanisms for so projecting a load carriage or load forks are very old in the art and numerous patents have issued covering various types of constructions. However, so far as I am aware, no really desirable construction has as yet been developed although I have personally contributed to the art projecting constructions that I think have considerable utility. The projecting and retracting construction that I shall disclose in this application contributes highly desirable results, while being extremely simple. Thus, I utilize two pairs of links, with one pair of links pivoted to the lifting carriage of the truck and the other pair of links pivoted to the load platform or load forks. Through the novel manner of interconnecting those ends of the links opposed to the ends pivoted to the carriage and load forks, I obtain very important results set forth hereinafter.

As one feature of my invention, I am able to obtain a very considerable projection of the load forks while yet obtaining a relatively low overall height of the links when the links hold the load forks retracted. Through this construction, I avoid one of the difficulties of the prior art in which the links have a rear high overall height when holding the load forks retracted.

As a further feature of the invention, no sliding mechanism is required for any of the links, all of the links being interconnected through pivots and having no sliding movement. This naturally eliminates friction and contributes very considerable rigidity so that the linkage mechanism alone will hold the load in any projected position.

As a further feature of my invention, the linkage mechanism will contribute substantial level projection of the load forks despite the fact that no sliding pivots or sliding means are utilized. This is an extremely important feature of the invention, as those skilled in the art will appreciate.

As a still further feature of the invention, I utilize a minimum of pivots, requiring only seven pivots in the specific form of the invention herein illustrated.

As a still further feature of the invention, I am able to withdraw within the uprights and entirely within the carriage all of the linkage mechanism so as to contribute full retraction of the load. As a matter of fact, as will appear presently, each linkage mechanism can project the load forwardly of a particular position and also rearwardly of that position, should such rearward projection be desired.

I have thus outlined rather broadly the important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring to the drawings:

FIG. 1 is a side elevational view of a load projecting and retracting mechanism constructed in accordance with the invention and showing the mechanism in a retracted position;

FIG. 2 is a view similar to that of FIG. 1, but showing the mechanism in a projected position; and FIG. 3 is a top plan view of the mechanism as shown in FIG. 2.

Referring to the drawings, a load projecting and retracting mechanism constructed in accordance with the invention, indicated by the reference numeral 10 in the drawings, is shown mounted on the lifting carriage C of a conventional lift truck T. The lifting carriage C, in turn, is mounted for vertical movement on uprights U of the truck whereby the mechanism 10 may be raised and lowered in the conventional manner.

The projecting and retracting mechanism 10 includes a supporting or mounting plate 11 which is detachably connected to the carriage C through upper and lower hook members 12 and 13. A load engaging member or platform 14, which as shown in the drawings may be in the form of forks that can be inserted through a pallet, is attached at each side to the mounting plate 11 by identical linkage systems which support the load platform for projecting and retracting movement relatively to the supporting plate 11. Each of the linkage systems are formed of two sets of links including upper and lower links 15 and 16 and upper and lower links 17 and 18.

The first set of upper and lower links 15 and 16, on each side of the mechanism, are pivotally attached by means of upper and lower horizontal pivots 19 and 20 to vertically extending, transversely spaced brackets 21 which are welded, or otherwise secured, to and extend from the front of the supporting plate 11. The second set of upper and lower links 17 and 18, on each side of the mechanism, are pivotally attached by means of upper and lower horizontal pivots 22 and 23 to opposite sides of the load platform 14.

The opposite ends of the lower links 16 and 18, on each side of the mechanism, are pivotally attached together by a transverse horizontal pivot 24, while the upper link 15, on each side of the mechanism, is pivotally attached at the other end to an extension 18a of the link 18 by a horizontal pivot 25, and the opposite end of the link 17, on each side of the mechanism, is pivotally connected to an extension 16a of the link 16 by a pivot 26.

A hydraulic ram 27 is pivotally attached at its upper end by means of a pivot 28 to a bracket 29, which in turn is secured to the front of the supporting plate 11, between the brackets 21. The lower end of the ram 27 is pivotally attached by means of a pivot shaft 30 to the outer ends of crank arms 31, which are attached to, or formed integrally with, the pivots 20 of the lower links 16, whereby the crank arms 31 and links are connected together by the pivots 20.

With this arrangement, if the links are in the position shown in FIG. 1, and the ram 27 is contracted through admission of fluid under pressure to the ram by operation of a suitable control valve, the load platform 14 will be projected in a substantially straightline path through an unfolding of the links, as shown in FIG. 2. If the ram 27 is thereafter extended, the load platform 14 will be retracted in a substantially straightline position through folding of the links. Thus, through operation of the ram 27, the load platform 14 may be retracted or projected to any degree to facilitate engagement of the platform with a load, or to facilitate depositing of a load supported on the platform in a particular spot. When the mechanism is in the fully retracted position, as shown in FIG. 1, pivots 23, through which the links 18 are connected to the load platform 14, are rearwardly of the pivots 20, through which the links 16 are connected to the mounting plate 11, and the links 18 are positioned within the space between the links 16 so that maximum retraction of the load platform 14 is obtained.

It will be particularly noted that while the linkage system of the invention provides for considerable projection of the load platform, the links have a relatively low overall height, even when the load platform is retracted, as shown in FIG. 1. It will also be noted that no sliding mechanism is required for any of the links, as all the links of the linkage system of each side of the mechanism are interconnected through seven simple pivots, which have no sliding movement. Thus, friction is substantially reduced, while providing a structure which is relatively rigid against both vertical and lateral deflection. At the same time, the linkage mechanism contributes substantially level, straightline projection of the load platform despite the fact that no sliding pivots or sliding means are utilized.

While one form of the invention has been shown and described, it will be appreciated that this is for the purpose of illustration, and that changes and modifications may be made therein without departing from the spirit and scope of the invention.

I now claim:

1. In an industrial truck of the class described, a load support on said truck, a load platform, means mounting said load platform for longitudinal projection and retraction relatively to said load support comprising a first set of upper and lower links pivoted at one end to said load support at longitudinally spaced points, a second set of upper and lower links pivoted at one end to said load platform at longitudinally spaced points, means pivoting the said lower links to one another, means pivoting each of the upper links of each set to the lower link of the other set, ram means, means mounting said ram means relative to said links and said load support, for extending and retracting said load platform relatively to said load support while said load platform is supported by said links, and lateral clearance between said lower links, said load support and load platform whereby said point of pivotal attachment of said lower link of said second set of links to said load platform may pass the point of pivotal attachment of said lower link of said first set of links to said load support during retraction and projection of said load platform.

2. In an industrial truck of the class described, a load support on said truck, a load platform, means mounting said load platform for longitudinal projection and retraction relatively to said load support comprising a first set of upper and lower links pivoted at the lower ends thereof to said load support, a second set of upper and lower links pivoted at the lower ends thereof to said load platform, means pivoting the said lower links to one another at a point inwardly of their upper ends, means pivoting the upper end of each of the upper links of each set to the upper end of the lower link of the other set, and ram means moving said links relative to said load support for extending and retracting said load platform relatively to said load support while said load platform is supported by said links, said point being offset longitudinally from all of said other pivoting means in the fully retracted position of said load platform.

3. In an industrial truck of the class described, a load support on said truck, a load platform, means mounting said load platform for longitudinal projection and retraction relatively to said load support comprising a first set of upper and lower links pivoted at the lower ends thereof to said load support at longitudinally and vertically spaced points, a second set of upper and lower links pivoted at the lower ends thereof to said load platform at longitudinally and vertically spaced points, means pivoting the said lower links to one another at a point inwardly of their upper ends, means pivoting the upper end of each of the upper links of each set to the upper end of the lower link of the other set, and ram means moving said links relative to said load support for extending and retracting said load platform relatively to said load support while said load platform is supported by said links, said point being centrally located and offset longitudinally relative to all of said other pivot points and pivoting means when said load platform is fully retracted.

4. In an industrial truck of the class described, a load support on said truck, a load platform, means mounting said load platform for longitudinal projection and retraction relatively to said load support comprising a first set of upper and lower links pivoted at the lower ends thereof to said load support, a second set of upper and lower links pivoted at the lower ends thereof to said load platform, means pivoting the said lower links to one another at a point inwardly of their upper ends, means pivoting the upper end of each of the upper links of each set to the upper end of the lower link of the other set, ram means moving said links relative to said load support for extending and retracting said load platform relatively to said load support while said load platform is supported by said links, and lateral clearance between said lower links, said load support, and load platform whereby said point of pivotal attachment of said lower link of said second set of links to said load platform may pass the point of pivotal attachment of said lower link of said first set of links to said load support during retraction and projection of said load platform.

5. In an industrial truck of the class described, a load support on said truck, a load platform, means mounting said load platform for longitudinal projection and retraction relatively to said load support comprising a first set of upper and lower links pivoted at the lower ends thereof to said load support at longitudinally spaced points, a second set of upper and lower links pivoted at the lower ends thereof to said load platform at longitudinally spaced points, means pivoting the said lower links to one another at a point inwardly of their upper ends, means pivoting the upper end of the upper link of the first set to the upper end of the lower link of the second set at a point offset longitudinally toward said load support from said means pivoting said lower links to one another, means pivoting the upper link of said second set to the upper end of the lower link of said first set at a point offset longitudinally toward said load platform from said means pivoting said lower links to one another, the pivot points of the lower ends of the lower links being offset laterally to provide clearance whereby said points may pass each other during retraction of the load platform, and ram means moving said links relative to said load support for extending and retracting said load platform relatively to said load support while said load platform is supported by said links.

6. In an industrial truck of the class described, a load support on said truck, a load platform, means mounting said load platform for longitudinal projection and retraction relatively to said load support comprising a first set of upper and lower links, pivoted at one end to said load support at longitudinally and vertically spaced points, a second set of upper and lower links pivoted at one end to said load platform at longitudinally and vertically spaced points, a common pivot point for pivoting the said lower links to one another, means pivoting each of the upper links of each set to the lower link of the other set, all of the pivot points of said upper links being offset longitudinally and vertically from said common pivot point when the load platform is retracted, and ram means connected to said load support and adapted to actuate at least one of said links for moving said links relatively to one another and relatively to said load support for extending and retracting said load platform relatively to said load support while said load platform is supported by said links.

References Cited by the Examiner

UNITED STATES PATENTS

| | | | |
|---|---|---|---|
| 2,616,578 | 11/52 | Dunham | 214—514 |
| 2,752,058 | 6/56 | Gibson | 214—730 |
| 2,785,807 | 3/57 | Prowinsky. | |
| 2,800,236 | 7/57 | Schenkelberger | 214—574 |
| 2,829,785 | 4/58 | Pitts | 214—730 |

FOREIGN PATENTS

| | | |
|---|---|---|
| 43,104 | 11/25 | Norway. |
| 166,440 | 1/34 | Switzerland. |

HUGO O. SCHULZ, *Primary Examiner.*

MORRIS TEMIN, *Examiner.*